(12) United States Patent
Mori

(10) Patent No.: US 10,730,467 B2
(45) Date of Patent: Aug. 4, 2020

(54) VEHICLE INPUT-OPERATION ASSISTANCE DEVICE

(71) Applicant: TOYOTA JIDOSHA KABUSHIKI KAISHA, Toyota-shi, Aichi-ken (JP)

(72) Inventor: Masashi Mori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 255 days.

(21) Appl. No.: 15/914,393

(22) Filed: Mar. 7, 2018

(65) Prior Publication Data

US 2018/0265028 A1 Sep. 20, 2018

(30) Foreign Application Priority Data

Mar. 16, 2017 (JP) .................................. 2017-051900

(51) Int. Cl.
*B60R 21/04* (2006.01)
*B60N 2/75* (2018.01)
(Continued)

(52) U.S. Cl.
CPC .............. *B60R 21/04* (2013.01); *B60N 2/753* (2018.02); *B60N 2/78* (2018.02); *B60N 2/797* (2018.02);
(Continued)

(58) Field of Classification Search
CPC ........ B60R 21/04; B60N 2/753; B60N 2/797; B60N 2/78; B60D 1/12; B62D 1/12;
(Continued)

(56) References Cited

U.S. PATENT DOCUMENTS 4,536,980 A * 8/1985 Fleming .................... B44F 7/00
40/427
5,467,950 A * 11/1995 Dumitru ............ A47B 21/0371
248/118.1
(Continued)

FOREIGN PATENT DOCUMENTS

JP 2003-280814 A 10/2003
JP 2006-027394 A 2/2006
(Continued)

*Primary Examiner* — Eret C McNichols
(74) *Attorney, Agent, or Firm* — Oliff PLC

(57) ABSTRACT

A vehicle input-operation assistance device includes: a traveling state detection section that detects a traveling state of a vehicle; an operation state detection section that detects an operation state of an operation member gripped by an occupant during operation; a support section that is capable of being stowed in an interior component of the vehicle, and that is capable of projecting from the interior component to a support position where the support section is capable of supporting an elbow of the occupant when the occupant is operating the operation member; and a controller that determines whether or not the elbow of the occupant operating the operation member needs to be supported based on information detected by the traveling state detection section and the operation state detection section and, in cases in which support is determined to be needed, controls the support section to project to the support position.

3 Claims, 6 Drawing Sheets

(51) Int. Cl.
*G05G 5/00* (2006.01)
*G05G 9/047* (2006.01)
*B62D 1/12* (2006.01)
*G05G 1/015* (2008.04)
*G05G 1/04* (2006.01)
*G05G 1/62* (2008.04)
*B60R 21/015* (2006.01)
*B60R 21/00* (2006.01)
*B60R 21/01* (2006.01)
*B60R 21/02* (2006.01)

(52) U.S. Cl.
CPC .............. *B62D 1/12* (2013.01); *G05G 1/015* (2013.01); *G05G 1/04* (2013.01); *G05G 1/62* (2013.01); *G05G 5/005* (2013.01); *G05G 9/047* (2013.01); *B60R 21/01552* (2014.10); *B60R 2021/0041* (2013.01); *B60R 2021/01252* (2013.01); *B60R 2021/0273* (2013.01); *B60R 2021/0293* (2013.01)

(58) Field of Classification Search
CPC ............ G05G 1/015; G05G 1/62; G05G 1/04; G05G 5/005
USPC ............... 248/228.1, 309.1, 310, 311.2, 314, 248/346.05, 346.07, 346.11, 550; 224/926; 296/24.34, 37.8

See application file for complete search history.

(56) References Cited

U.S. PATENT DOCUMENTS

| | | | |
|---|---|---|---|
| 6,056,247 A * | 5/2000 | Hoglund | G05G 1/58 248/118.1 |
| 6,843,458 B1 * | 1/2005 | Robinson | A47G 23/0216 248/311.2 |
| 9,358,930 B1 * | 6/2016 | Sic | B60N 3/101 |
| 2016/0306424 A1 * | 10/2016 | Vanhelle | G06F 3/01 |
| 2017/0010675 A1 * | 1/2017 | Lee | B60K 37/06 |
| 2018/0170227 A1 * | 6/2018 | Shirota | B60K 35/00 |
| 2019/0389352 A1 * | 12/2019 | Koller | B60R 16/037 |

FOREIGN PATENT DOCUMENTS

JP 2013-098133 A 5/2013
WO WO-2007034567 A1 * 3/2007 .............. G05G 1/04

* cited by examiner

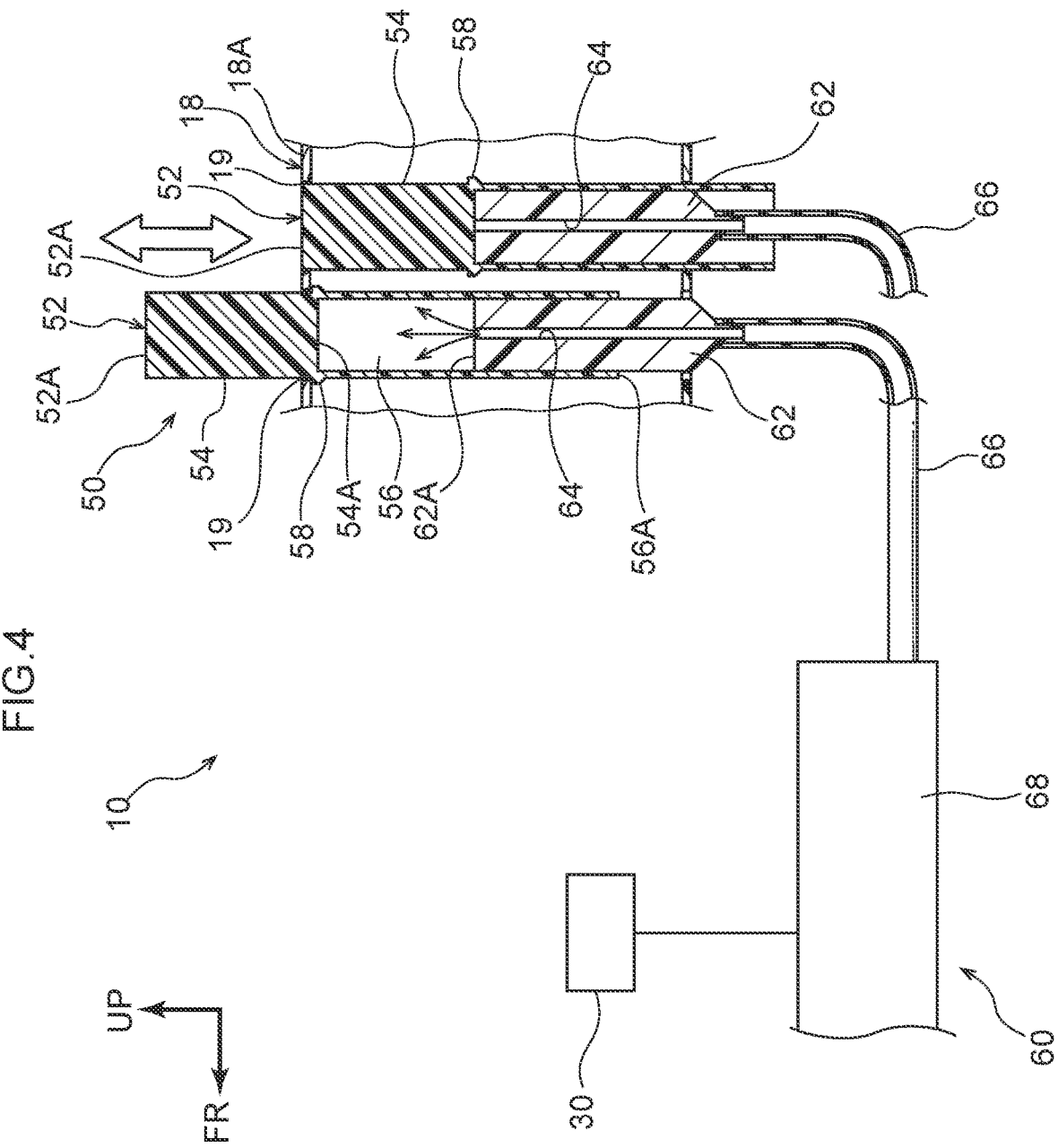

VEHICLE INPUT-OPERATION ASSISTANCE DEVICE

CROSS-REFERENCE TO RELATED APPLICATION

This application is based on and claims priority under 35 USC 119 from Japanese Patent Application No. 2017-051900 filed on Mar. 16, 2017, the disclosure of which is incorporated by reference herein.

BACKGROUND

Technical Field

The present disclosure relates to a vehicle input-operation assistance device

Related Art

Input control devices are hitherto known including an operation state detection section, a controller, and a traveling state detection section (for example, see Japanese Patent Application Laid-Open (JP-A) No. 2006-27394). The operation state detection section detects an operation state of an operation member and outputs an operation signal. The controller controls operation of an onboard device in accordance with the operation signal. The traveling state detection section detects a traveling state of the vehicle and outputs a traveling state signal.

In this input control device, the controller determines whether or not the operation of the operation member is normal operation as intended by an occupant based on the operation signal and the traveling state signal, and in cases in which determination is made that the operation is not normal operation, makes correction to disable the operation or reduce the operation amount of the operation member.

However, in the controller of the input control device described above, when vibrations or the like are being detected by the traveling state detection section, despite the operation of the operation member being intended by the occupant, it is possible that determination is made that the fingers of the occupant moved as a result of the vibrations or the like, and it is possible that this operation is disabled even though it was a normal operation intended by the occupant.

It is therefore difficult to precisely determine whether or not operation of the operation member is normal operation intended by an occupant based solely on a determination by the controller of the input control device. Thus, it is desirable to achieve a structure that may prevent movement of the fingers of an occupant operating the operation member moving because of disturbance during traveling, and may reduce erroneous operation of an operation member, without relying on such a controller.

SUMMARY

The present disclosure provides a vehicle input-operation assistance device that may prevent or suppress the fingers of an occupant operating an operation member from moving because of disturbances during traveling, and prevent or suppress the operation member from being operated unintentionally.

A first aspect of the present disclosure is a vehicle input-operation assistance device including a traveling state detection section that is configured to detect a traveling state of a vehicle; an operation state detection section that is configured to detect an operation state of an operation member gripped by an occupant during operation; a support section that is configured to be capable of being stowed in an interior component of the vehicle, and that is configured to be capable of projecting from the interior component to a support position where the support section is capable of supporting an elbow of the occupant when the occupant is operating the operation member; and a controller that is configured to determine whether or not the elbow of the occupant operating the operation member needs to be supported based on information detected by the traveling state detection section and the operation state detection section, and, in cases in which support is determined to be needed, to control the support section to project to the support position.

According to the above aspect, the controller determines whether or not the elbow of the occupant operating the operation member needs to be supported based on information detected by the traveling state detection section and the operation state detection section, and, in cases in which support is determined to be needed, controls so as to cause the support section to project to the position where the support section is capable of supporting the elbow of the occupant. Accordingly, movement by the fingers of an occupant operating the operation member because of disturbances during travel is suppressed by the support section, thereby reducing erroneous operation of the operation member.

The above aspect may be configured such that the controller is configured to predict inertial force that will act on an occupant in a vehicle front-rear direction and a vehicle width direction based on information of a scheduled travel plan and information detected by the traveling state detection section and the operation state detection section, and in cases in which determination is made that an inertial force of a predetermined value or greater will occur, control the support section to project to the support position in advance of the inertial force occurring.

According to this configuration, the controller may predict inertial force that will act on an occupant in a vehicle front-rear direction and a vehicle width direction based on information in a scheduled travel plan and information detected by the traveling state detection section and the operation state detection section, and in cases in which determination is made that an inertial force of a predetermined value or greater will occur, causes the support section to project to the position capable of supporting the elbow of the occupant. Thus, erroneous operation of the operation member is suppressed even when the inertial force acting on the occupant is the predetermined value or greater.

The above aspect may be configured such that the vehicle input-operation assistance device further includes a physical build detection section that is configured to detect a physical build of an occupant, wherein the support section includes plural projection members arrayed in a vehicle front-rear direction and vehicle width direction; and the controller is configured to select several of the projection members based on the physical build of the occupant detected by the physical build detection section, and to control the selected projection members to project to the support position.

According to this configuration, to match the physical build of the occupant detected by the physical build detection section, the controller selects several projection members from the plural projection members configuring the support section and causes these projection members to project to the position capable of supporting the elbow of the occupant. Erroneous operation of the operation member is thereby suppressed irrespective of the physical build of the riding occupant.

Thus, as explained above, the present disclosure enables the fingers of an occupant operating the operation member to be suppressed from moving because of disturbances during traveling and the operation member from being operated unintentionally.

BRIEF DESCRIPTION OF THE DRAWINGS

An exemplary embodiment of the present disclosure will be described in detail based on the following figures, wherein:

FIG. 4 is a cross-section illustrating a structure of the support section according to the exemplary embodiment;

DETAILED DESCRIPTION

Figure 1:
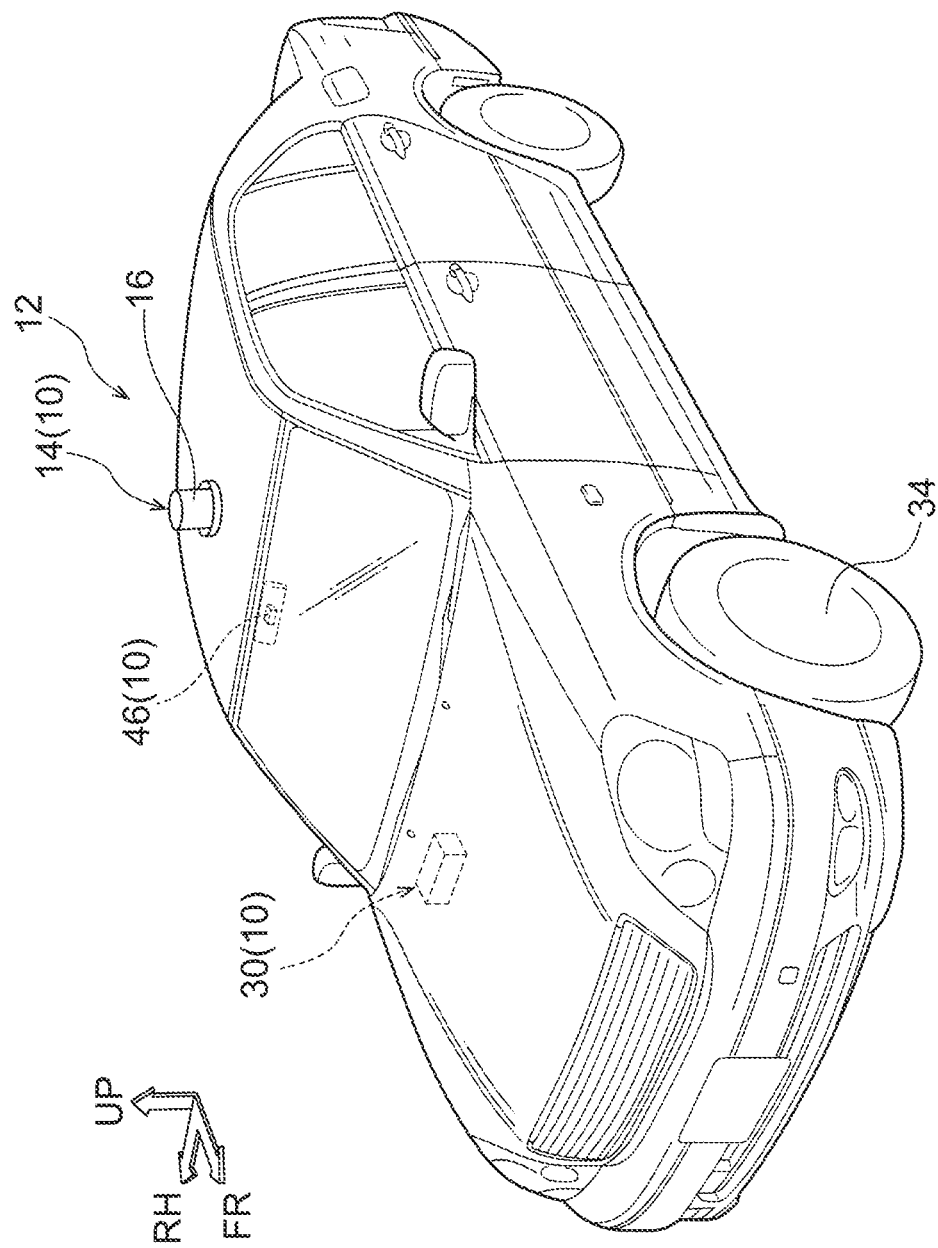
FIG. 1 is a perspective view illustrating a self-driving vehicle according to an exemplary embodiment.

Detailed explanation follows regarding an exemplary embodiment according to the present disclosure, with reference to the drawings. Note that for ease of explanation, the arrow UP, the arrow FR, and the arrow RH illustrated in the drawings respectively indicate the vehicle upper side, the vehicle front, and the vehicle right. Accordingly, in the following explanation, unless specifically stated otherwise, reference to up and down, front and rear, and left and right directions refers to up and down in the vehicle vertical direction, front and rear in the vehicle front-rear direction, and left and right in the vehicle left-right direction (the vehicle width direction).

In the exemplary embodiment, explanation will be given of an example of a case in which a support section 50 configuring a vehicle input-operation assistance device 10 is applied to a self-driving vehicle 12. However, vehicles to which the support section 50 may be applied are not limited to the self-driving vehicle 12. In the exemplary embodiment, an occupant who drives the self-driving vehicle 12 when the self-driving vehicle 12 is in manual drive mode is referred to as "driver P".

Figure 2:
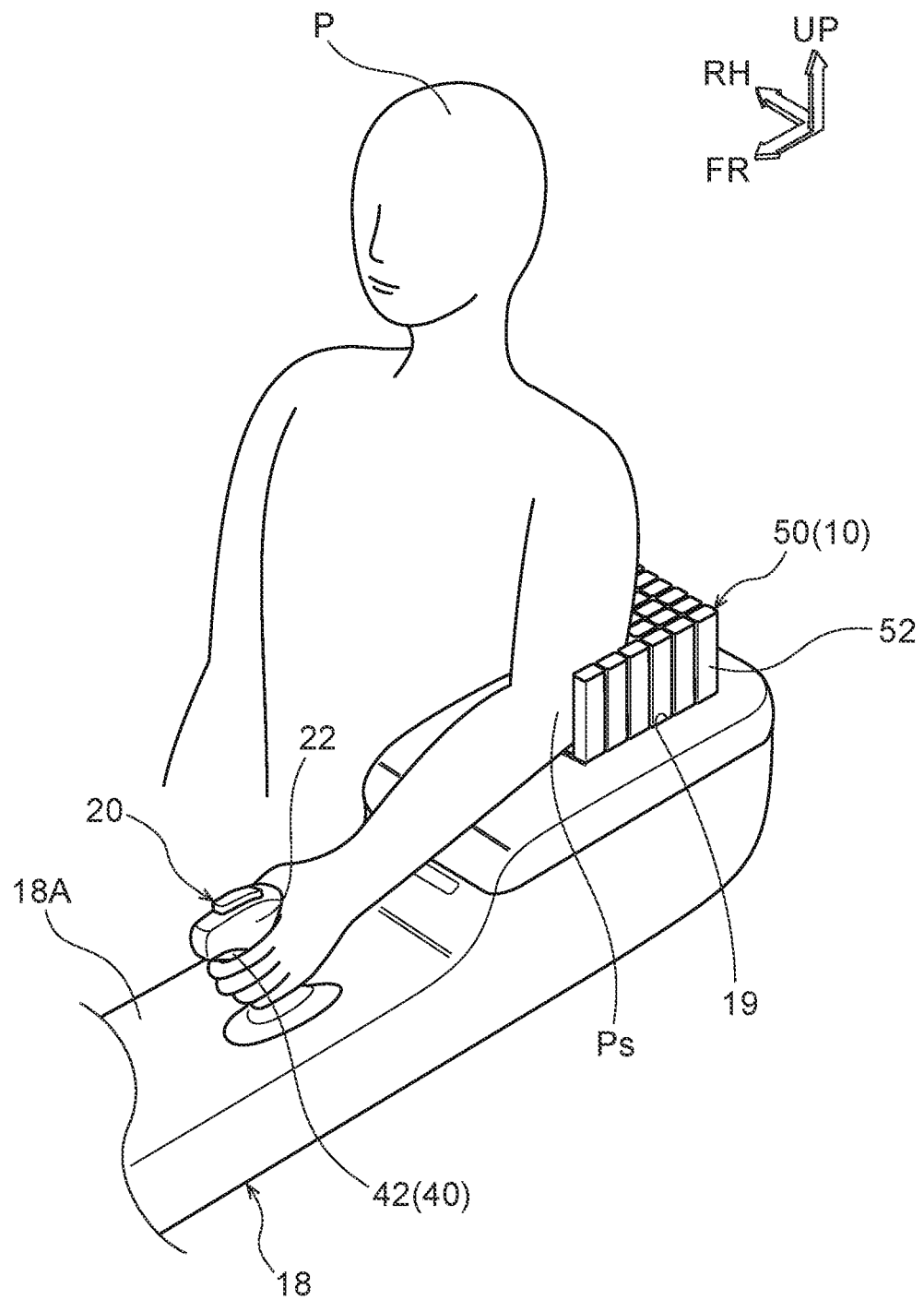
FIG. 2 is a perspective view illustrating a case in which a center console is provided with a support section according to the exemplary embodiment.

As illustrated in FIG. 1 and FIG. 2, the self-driving vehicle 12 includes a traveling state detection section 14, an operation state detection section 40, a controller 30, and an in-vehicle camera 46. The traveling state detection section 14 detects a traveling state of the self-driving vehicle 12. The operation state detection section 40 detects an operation state of a joystick 20, serving as an operation member, that is gripped by the driver P when operated in manual drive mode or when operated in self-driving mode. The controller 30 serves as a controller that controls the traveling state of the self-driving vehicle 12 based on information detected by the traveling state detection section 14 and the operation state detection section 40. The in-vehicle camera 46 serves as a physical build detection section that detects the physical build of the driver P.

The traveling state detection section 14 includes a vehicle speed sensor (not illustrated in the drawings) that detects the vehicle speed of the self-driving vehicle 12, a surrounding conditions detection sensor 16 that detects the surrounding conditions of the self-driving vehicle 12 (traveling lanes, inter-vehicular distances, and so on), and the like. The controller 30 includes a microcomputer composed of a CPU and the like. The controller 30 is electrically connected to each sensor configuring the traveling state detection section 14, each sensor configuring the operation state detection section 40, the in-vehicle camera 46, and so on. The controller 30 is configured such that each section is controlled according to the information obtained from these sensors.

Figure 3:
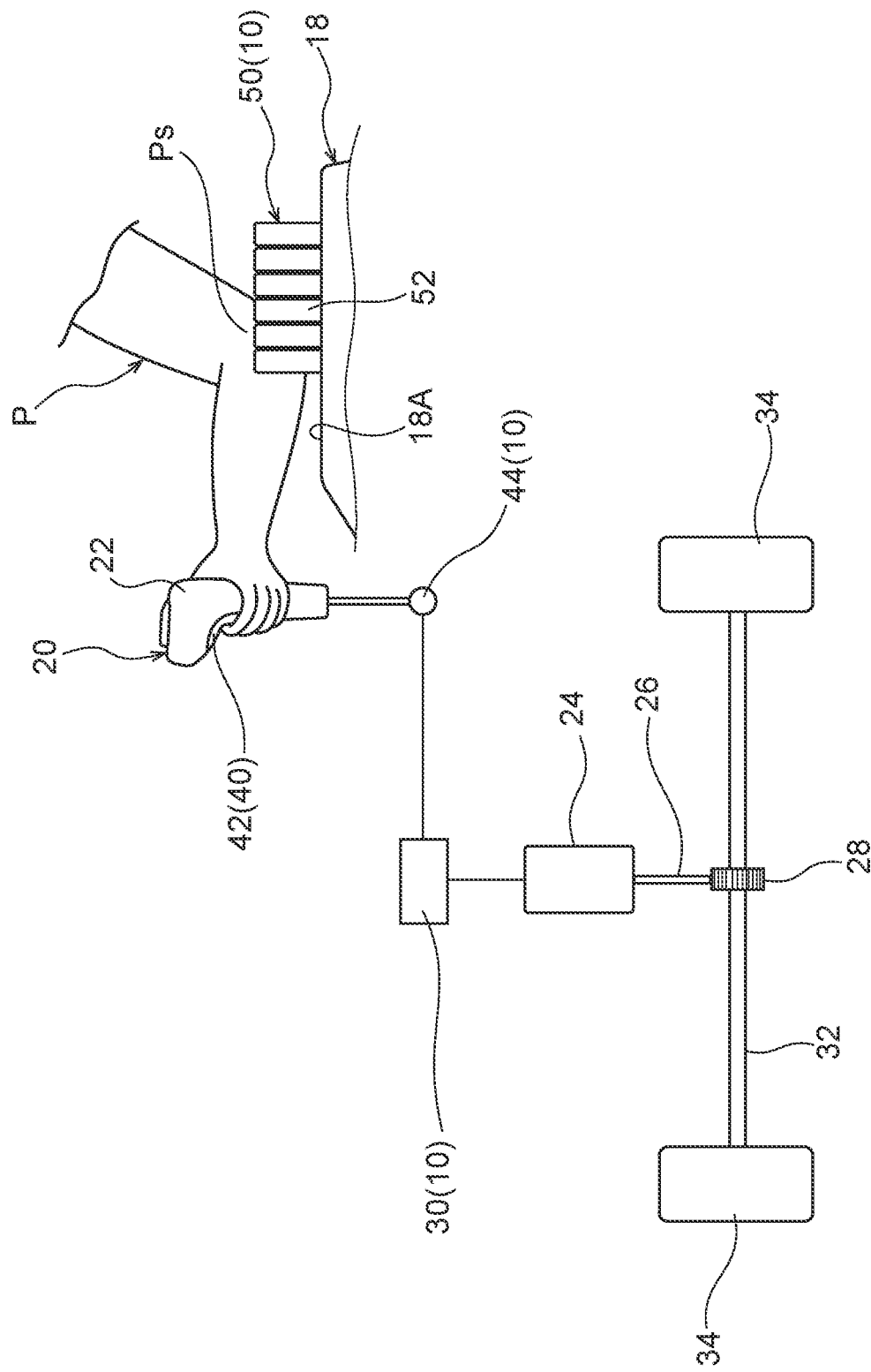
FIG. 3 is a configuration diagram illustrating a drive system operated by the support section and a joystick according to the exemplary embodiment.

The joystick 20 is provided at a center console 18 inside the vehicle cabin of the self-driving vehicle 12, and is swing-operated by the driver P in the front-rear direction and left-right direction. Specifically, as illustrated in FIG. 2 and FIG. 3, an upper end of the joystick 20 projects from an upper face 18A of the center console 18, and a grip 22 which is gripped by the driver P is provided at the upper end of the joystick 20.

A grip sensor 42 that detects that the grip 22 of the joystick 20 has been gripped by the driver P is provided at a front end of the grip 22. The grip sensor 42 is one of the sensors configuring the operation state detection section 40, and is electrically connected to the controller 30.

A lower end of the joystick 20 is supported within the center console 18 so as to be capable of rotating about a rotation shaft (not illustrated in the drawings) disposed along the vehicle width direction and vehicle front-rear direction. The rotation shaft is provided with a steering angle sensor (rotation angle sensor) 44 that configures the operation state detection section 40. The steering angle sensor 44 detects the angle of rotation of the joystick 20 in the front-rear direction and the left-right direction from its neutral position.

When in manual drive mode, swinging the joystick 20 in the left-right direction steers front wheels 34. Specifically, the angle of rotation of the joystick 20 in the left-right direction from its neutral position is detected by the steering angle sensor 44, and the controller 30 outputs a steering angle (steer amount) to an electric motor 24 based on the detection results (i.e., obtained information).

A reduction gear is built into the electric motor 24, and is connected so as to be capable of transmitting drive force to an upper end of a steering output shaft 26 so as to rotationally drive the upper end of the steering output shaft 26. A pinion gear 28 is fixed at a lower end of the steering output shaft 26, and a rack bar 32 meshes with the pinion gear 28. The left and right front wheels 34 are coupled to the two vehicle width direction ends of the rack bar 32 so as to be capable of being steered.

Accordingly, configuration is such that, based on the angle of rotation of the joystick 20 in the left-right direction from its neutral position as detected by the steering angle sensor 44, the left and right front wheels 34 are steered by the controller 30 controlling the electric motor 24 (outputting a steering angle to the electric motor 24) to rotate the steering output shaft 26, namely the pinion gear 28, so as to displace the rack bar 32 along its axial direction (i.e., vehicle width direction).

Although detailed explanation is omitted, configuration is made such that in self-driving mode, onboard devices such as an audio device provided inside the vehicle cabin of the self-driving vehicle 12 may be operated by, for example, swinging the joystick 20 in the front-rear direction and operating switches provided to the grip 22.

As illustrated in FIG. 2 and FIG. 3, the resin support section 50 is provided to the center console 18, serving as an interior component, at a vehicle rear side of the joystick 20. The support section 50 is configured so as to be capable of being stowed inside the center console 18, and configured so as to be capable of projecting upward from an opening 19 formed in the center console 18, up to a position capable of supporting the elbow Ps of the driver P when the driver P is operating the joystick 20.

Figure 5A:
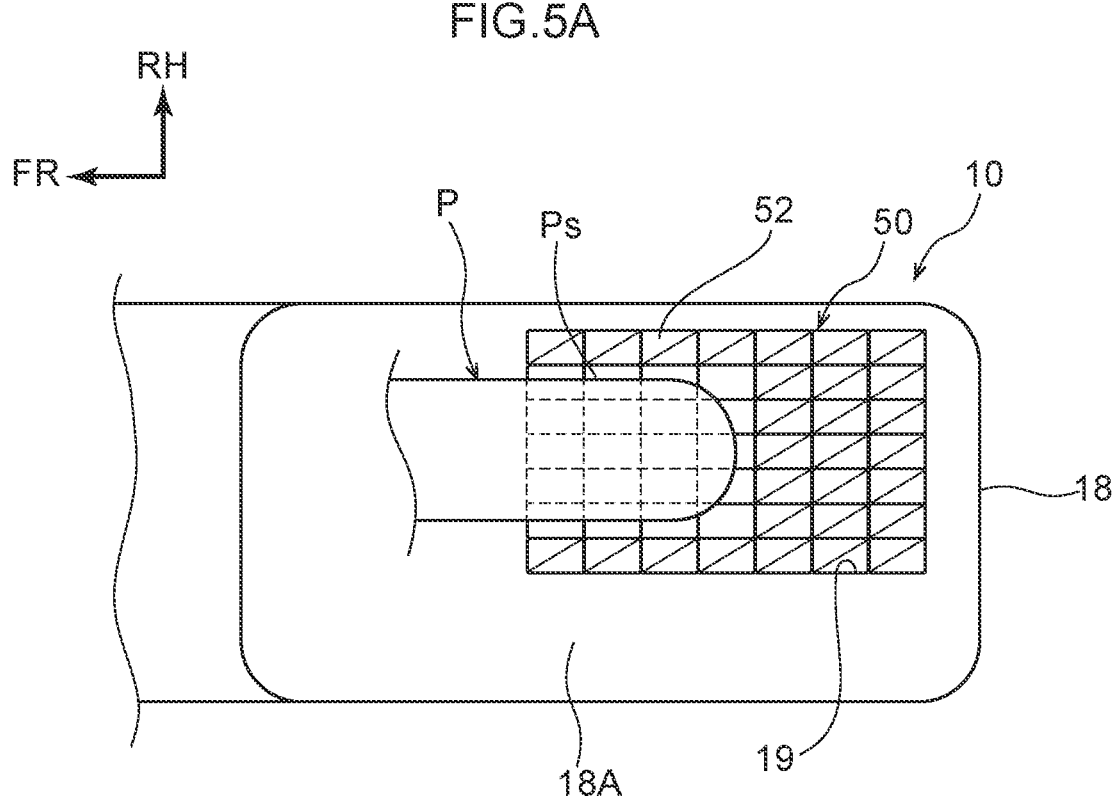
FIG. 5A is a plan view illustrating the support section in a case of a driver having a standard physical build according to the exemplary embodiment.
Figure 5B:
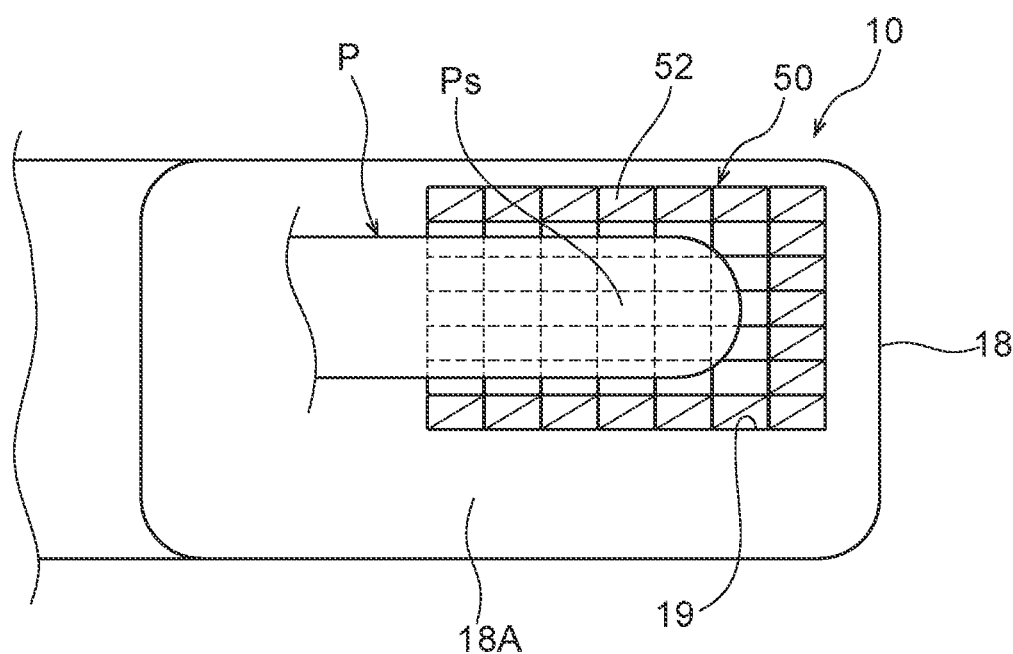
FIG. 5B is a plan view illustrating the support section in a case of a driver having a comparatively large physical build according to the exemplary embodiment.

The support section 50 is configured by plural angular column shaped projection members 52 arrayed in the vehicle front-rear direction and vehicle width direction (for example, 49 in total, with 7 rows in the vehicle front-rear direction and 7 rows in the vehicle width direction, see FIG. 5A and FIG. 5B). As illustrated in FIG. 4, each projection member 52 is configured so as to be raised and lowered by a raising-and-lowering portion 60 that supplies air into or releases air out from a hollow portion 56, described later.

Specifically, each projection member 52 is formed in an oblong shape (rectangle) having its long edges along the vehicle front-rear direction in plan view (see FIG. 5A and FIG. 5B). Each projection member 52 is formed with a solid-shaped supporting portion 54 projecting toward the upper side from the opening 19 of the center console 18. At the lower side of the supporting portion 54, each projection member 52 is also configured by a hollow portion 56 that is formed in a hollow shape, and a lower end 56A of the hollow portion 56 is open.

Plural (49 in this case) angular column shaped supporting members 62 are attached to a lower side of the opening 19 of the center console 18. The hollow portion 56 of each projection member 52 is fitted onto the respective supporting member 62 from the upper side, sheathing the supporting member 62 such that there is substantially no gap therebetween. Namely, each supporting member 62 is also formed in an oblong shape (rectangle) having its long edges along the vehicle front-rear direction in plan view, and is configured so as to be inserted into the hollow portion 56 of the respective projection member 52 relatively from the lower side such that there is substantially no gap therebetween.

Further, a flow path 64 through which air passes is formed in a central portion (axial center) of the supporting member 62 along its entire height. One end of a flexible tube 66 that is in communication with the flow path 64 is connected in communication with a lower end of the respective supporting member 62, and another end of the flexible tube 66 is provided inside the center console 18 and is connected in communication with an air pump 68 that is configured so as to be capable of supplying and releasing air.

Accordingly, when each projection member 52 is made to project from the inside of the center console 18, the air pump 68 is actuated and air is supplied into the respective hollow portion 56 through the flexible tube 66 and the flow path 64. Thus, the air accumulates inside each hollow portion 56 while pushing up the respective supporting portion 54 toward the upper side, such that the respective projection member 52 rises up while being guided by the respective supporting member 62.

Although detailed illustration has been omitted, the opening 19 is formed in a lattice shape so as to correspond to each of the projection members 52. Around outer walls of each projection member 52 and at substantially the same height position as a lower face 54A of the respective supporting portion 54, a jutting out portion 58, serving as a stopper that abuts a peripheral edge of the respective opening 19 in the center console 18 from the lower side, is formed spanning around the entire periphery (or intermittently in the peripheral direction) of each projection member 52. As a result of the jutting out portions 58, configuration is such that the projection members 52 do not project from the upper face 18A of the center console 18 toward the upper side any more than necessary.

When stowing the projection members 52 inside the center console 18, the air pump 68 sucks out the air inside the hollow portions 56. Namely, by actuating the air pump 68, air inside the hollow portions 56 passes through the flow paths 64 and the flexible tubes 66 and is released out from the air pump 68 into the atmosphere.

Each projection member 52 it thereby lowered down to a position where it does not project from the opening 19 (i.e., to a position at which the lower face 54A of teach supporting portion 54 abuts an upper face 62A of the respective supporting member 62) while being guided by the respective supporting member 62. Upper faces 52A of the projection members 52 configure the upper face 18A (design face) of the center console 18.

Further, the air pump 68 is electrically connected to the controller 30, and is actuated under the control of the controller 30. Namely, under the control of the controller 30, air is supplied to or released out from the hollow portion 56 of each projection member 52 configuring the support section 50.

Specifically, when in manual drive mode, the controller 30 determines whether or not the elbow Ps of the driver P operating the joystick 20 needs to be supported based on information detected by the traveling state detection section 14 and the operation state detection section 40 (grip sensor 42). In cases in which the controller 30 has determined that support is needed, the controller 30 is configured to control operation of the air pump 68 to project the projection members 52 (support section 50) to a position capable of supporting the elbow Ps of the driver P.

Further, configuration is made such that during acceleration, deceleration or steering, the controller 30 predicts inertial force that will act on the driver P in the vehicle front-rear direction or the vehicle width direction (either acceleration/deceleration G or lateral G) based on information detected by the traveling state detection section 14 and the operation state detection section 40 (grip sensor 42), and in cases in which determination is made that an inertial force of a predetermined value or greater will occur, controls so as to make the projection members 52 project to a position capable of supporting the elbow Ps of the driver P in advance of the inertial force occurring (i.e., before the inertial force acts).

Moreover, the controller 30 is configured to control so as to cause several selected projection members 52 of the plural projection members 52 to project so as to enable the elbow Ps of the driver P to be supported (to be stably held) in accordance with the physical build of the driver P detected by the in-vehicle camera 46.

Namely, in the case of a driver P having a standard physical build, for example, the projection members 52 in the region illustrated by diagonal lines in FIG. 5A project toward the upper side so as to support the elbow Ps of the driver P. In the case of a driver P having a comparatively large physical build, for example, the projection members 52 in the region illustrated by diagonal lines in FIG. 5B project toward the upper side so as to support the elbow Ps of the driver P.

As described above, in manual drive mode, the joystick 20 is configured so as to steer the front wheels 34 of the self-driving vehicle 12, and in self-driving mode, the joystick 20 is configured so as to be capable of operating onboard devices such as an audio device. Accordingly, even when the joystick 20 is operated in self-driving mode, the projection members 52 (the support section 50) are configured so as to project to positions capable of supporting the elbow Ps of the driver P as required.

Namely, configuration is made such that during acceleration, deceleration or steering in self-driving mode, controller 30 predicts inertial force that will act on the driver P in the vehicle front-rear direction or the vehicle width direction (either acceleration/deceleration G or lateral G) based on information in a scheduled travel plan (including a travel route). In cases in which determination is made that an inertial force of a predetermined value or greater will occur, controls so as to make the projection members 52 project to positions capable of supporting the elbow Ps of the driver P in advance of the inertial force occurring (i.e., before the inertial force acts).

Explanation follows regarding operation of the vehicle input-operation assistance device 10 (support section 50) according to the exemplary embodiment configured as described above.

When the self-driving vehicle 12 is in manual drive mode, when the driver P operates the joystick 20 to steer the front wheels 34, first, the controller 30 determines whether or not the elbow Ps of the driver P operating the joystick 20 needs to be supported based on information detected by the traveling state detection section 14 (surrounding conditions detection sensor 16) and the operation state detection section 40 (grip sensor 42).

More specifically, based on this information, the controller 30 predicts inertial force that will act on the driver P in the vehicle front-rear direction or the vehicle width direction (either acceleration/deceleration G or lateral G) during acceleration, deceleration or steering. In cases in which the controller 30 has determined that the elbow Ps of the driver P needs to be supported (i.e., that an inertial force of a predetermined value or greater will occur), the controller 30 makes the projection members 52 configuring the support section 50 project to positions capable of supporting the elbow Ps of the driver P in advance of the inertial force occurring (i.e., before the inertial force acts).

Namely, in the case of a driver P having a standard physical build, for example, the air pump 68 supplies gas through the flexible tubes 66 and the flow paths 64 into the hollow portions 56 of the projection members 52 in the region illustrated by diagonal lines in FIG. 5A. When this is performed, air accumulates in the hollow portions 56 between the lower faces 54A of the respective supporting portions 54 and the upper faces 62A of the respective supporting members 62, and the supporting portions 54 of the respective projection members 52 project toward the upper side from the opening 19 of the center console 18 until the jutting out portions 58 formed around the outer walls of the respective projection members 52 abut the lower side of the respective peripheral edges of the opening 19 (see FIG. 4).

Thus, as illustrated in FIG. 2 and FIG. 5A, the supporting portions 54 of the respective projection members 52 project in substantially a U-shape in plan view, and the elbow Ps of the driver P is covered (enclosed) and supported from the vehicle rear side, the vehicle width direction outer side, and vehicle width direction inner side by the supporting portions 54 of the respective projection members 52. Namely, the driver P is stably held by the support section 50 from the elbow Ps up to the fingers.

Thus, when the self-driving vehicle 12 is traveling in manual drive mode, movement of the fingers of a driver P operating the joystick 20 in an unintended direction because of disturbances such as inertial force or vibrations, namely erroneous operation of the joystick 20, may be suppressed or prevented by the support section 50 configured by the respective projection members 52.

Moreover, since the projection members 52 to be raised or lowered in the support section 50 is determined based on the detection of the physical build of the driver P by the in-vehicle camera 46, irrespective of the physical build of the driver P riding in the vehicle, erroneous operation of the joystick 20 by the driver P may be suppressed or prevented. In other words, problems, such as the elbow Ps of a driver P not being stably held by the support section 50, due to differences in physical build among drivers P may be suppressed or prevented from arising.

Note that in order for the driver P to operate onboard devices such as an audio device when the self-driving vehicle 12 is traveling in self-driving mode, the support section 50 may also be raised and lowered under control of the controller 30 when the joystick 20 is operated. More specifically, the controller 30 predicts inertial force that will act on the driver P in the vehicle front-rear direction or the vehicle width direction (either acceleration/deceleration G or lateral G) during acceleration, deceleration or steering based on information in a scheduled travel plan (including a travel route).

In cases in which the controller 30 has determined that the elbow Ps of the driver P needs to be supported (that an inertial force of a predetermined value or greater will occur), the controller 30 makes the projection members 52 configuring the support section 50 project to a position capable of supporting the elbow Ps of the driver P in advance of the inertial force occurring (i.e., before the inertial force acts). Thus, when onboard devices such as an audio device are operated using the joystick 20 in self-driving mode, erroneous operation of the joystick 20 because of disturbances such as inertial force or vibrations may be suppressed or prevented by the support section 50.

Figure 6:
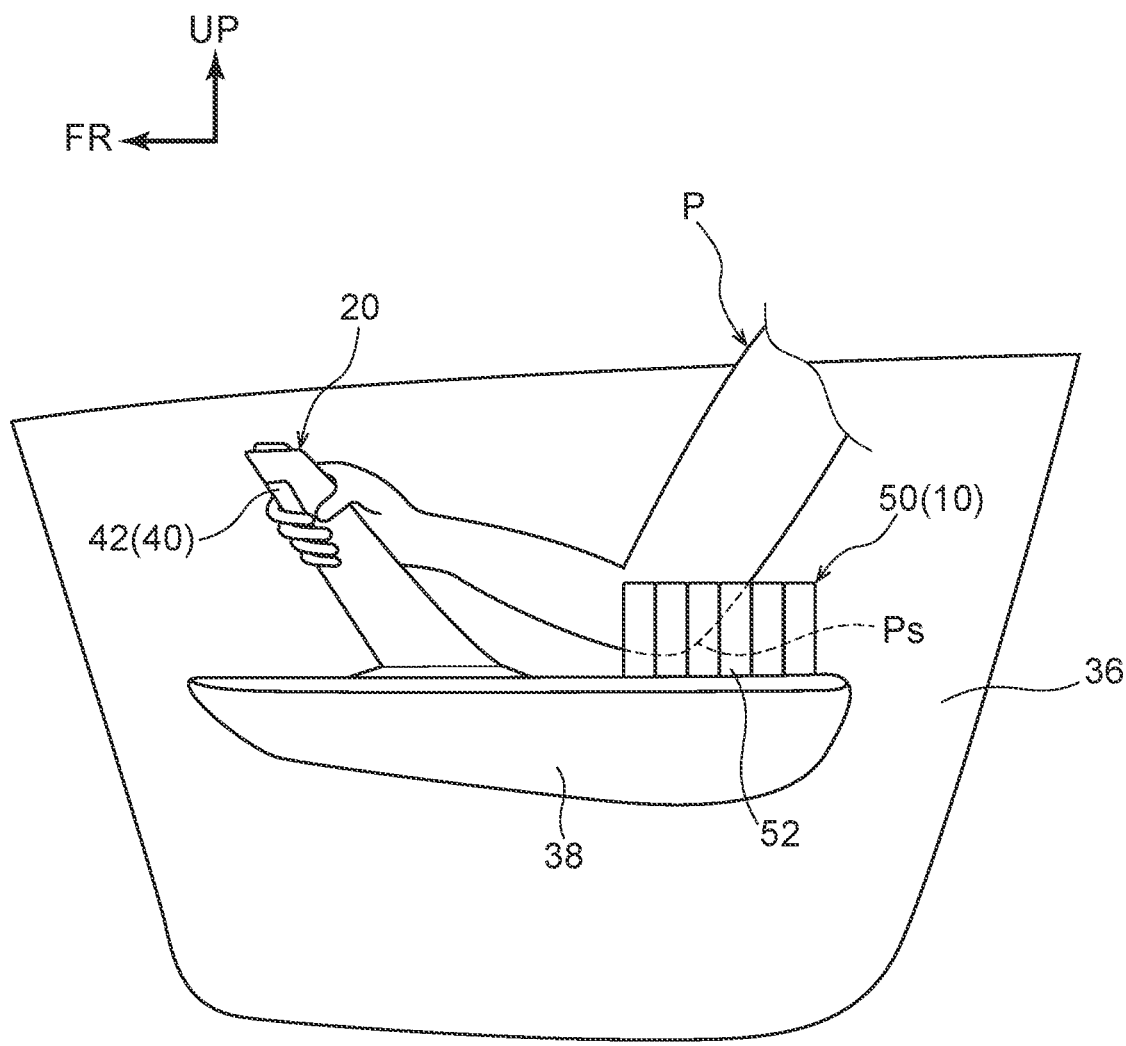
FIG. 6 is a side view illustrating a case in which an armrest of a door trim is provided with the support section according to the exemplary embodiment.

Note that the support section 50 configuring the vehicle input-operation assistance device 10 according to the exemplary embodiment is not limited to configuration provided to the center console 18. As illustrated in FIG. 6, for example, in cases in which the joystick 20 is provided to an armrest 38 serving as an interior component of a door trim 36, the support section 50 (the projection members 52) may be provided so as to be capable of being stowed in and projecting from the armrest 38 at the vehicle rear than the joystick 20.

In cases in which the support section 50 is provided to the armrest 38, the door trim 36 is present on the vehicle width direction outer side of the elbow Ps of the driver P. Thus, the supporting portions 54 of the projection members 52 may be configured so as to project in a substantial L-shape in plan view. Namely, the supporting portions 54 of the projection members 52 may be configured to project so as to cover (enclose) the vehicle rear side and the vehicle width direction inner side of the elbow Ps of the driver P.

Explanation has been given above regarding the vehicle input-operation assistance device 10 according to the exemplary embodiment based on the drawings. However, the vehicle input-operation assistance device 10 according to the exemplary embodiment is not limited to the drawings, and obviously design modifications may be implemented as appropriate within a range not departing from the spirit of the disclosure. For example, although the projection members 52 in the drawings all project to the same height, configuration may be made in which the jutting out portions 58 are set at positions such that the heights of the respective projection members 52 become gradually lower on progression toward the front.

Further, configuration may be made in which an elastic body for protecting the elbow Ps or the like is affixed to each face of the projection members 52 that contact the elbow Ps and the like of the driver P (such as the upper face 52A and side faces of the projection members 52). Further, although the projection members 52 are formed in angular column shapes that are oblong shapes in plan view, there is no limitation thereto, and the projection members 52 may, for example, be formed in angular column shapes that are squares in plan view.

Moreover, the raising-and-lowering portions 60 that raise and lower the respective projection members 52 are not limited to those of the exemplary embodiment described above (the supporting members 62 including the flow path 64, the flexible tube 66, and the air pump 68). Further, configuration of the drive system (steering of the front wheels 34 and so on) operated by the joystick 20 in manual drive mode is not limited to that of the exemplary embodiment described above.

What is claimed is:

1. A vehicle input-operation assistance device comprising:
    a traveling state detection section that is configured to detect a traveling state of a vehicle;
    an operation state detection section that is configured to detect an operation state of an operation member gripped by an occupant during operation;
    a support section that is configured to be stowed in an interior component of the vehicle, and that is configured to project from the interior component to a support position where the support section is capable of supporting an elbow of the occupant when the occupant is operating the operation member; and
    a controller that is configured to determine whether or not the elbow of the occupant operating the operation member needs to be supported based on the traveling state detected by the traveling state detection section and the operation state detected by the operation state detection section, and, in cases in which support is determined to be needed, to control the support section to project to the support position.

2. The vehicle input-operation assistance device of claim 1, wherein the controller is configured to predict inertial force that will act on an occupant in a vehicle front-rear direction and a vehicle width direction based on information of a scheduled travel plan, the traveling state detected by the traveling state detection section, and the operation state detected by the operation state detection section, and in cases in which determination is made that an inertial force of a predetermined value or greater will occur, control the support section to project to the support position in advance of the inertial force occurring.

3. The vehicle input-operation assistance device of claim 1, further comprising:
    a physical build detection section that is configured to detect a physical build of an occupant, wherein
    the support section comprises a plurality of projection members arrayed in a vehicle front-rear direction and vehicle width direction; and
    the controller is configured to select several of the projection members based on the physical build of the occupant detected by the physical build detection section, and to control the selected projection members to project to the support position.

* * * * *